United States Patent
Kataoka et al.

(10) Patent No.: US 9,592,850 B1
(45) Date of Patent: Mar. 14, 2017

(54) STEERING CONTROL APPARATUS

(71) Applicant: DENSO CORPORATION, Kariya, Aichi-pref. (JP)

(72) Inventors: Motoaki Kataoka, Kariya (JP); Hisaya Akatsuka, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 15/136,738

(22) Filed: Apr. 22, 2016

(51) Int. Cl.
   *B62D 5/04* (2006.01)

(52) U.S. Cl.
   CPC .................. *B62D 5/0463* (2013.01)

(58) Field of Classification Search
   CPC .... B62D 6/008; B62D 15/021; B62D 15/025; B62D 5/0463; G06K 9/00798
   USPC .............. 701/41, 42; 180/443, 446
   See application file for complete search history.

(56) References Cited

U.S. PATENT DOCUMENTS

| | | | | |
|---|---|---|---|---|
| 5,925,082 A * | 7/1999 | Shimizu | ............... | B62D 1/28 180/272 |
| 6,148,950 A * | 11/2000 | Mukai | ............... | B62D 5/0493 180/446 |
| 8,996,251 B2 * | 3/2015 | Kataoka | ............... | B62D 6/008 180/443 |
| 2002/0053481 A1 * | 5/2002 | Itakura | ............... | B62D 5/0463 180/446 |
| 2002/0120378 A1 * | 8/2002 | Kawada | ............... | B62D 5/049 701/41 |
| 2007/0010945 A1 * | 1/2007 | Shoda | ............... | G08G 1/163 701/301 |
| 2007/0282502 A1 * | 12/2007 | Bayer | ............... | B60W 10/04 701/42 |

(Continued)

FOREIGN PATENT DOCUMENTS

| JP | H09-221053 A | 8/1997 |
|---|---|---|
| JP | 2015-20604 A | 2/2015 |

(Continued)

OTHER PUBLICATIONS

Antonim et al., Variations in Drivers Mechanical Admittance Facing Distracting Tasks, IEEE, p. 2014, p. 1952-1957*

(Continued)

*Primary Examiner* — Mcdieunel Marc
(74) *Attorney, Agent, or Firm* — Knobbe, Martens, Olson & Bear, LLP

(57) ABSTRACT

A steering control apparatus includes an assist deviation calculator calculating an assist deviation, a follow deviation calculator calculating a follow deviation, a unit converter converting a measurement unit, a weighting factor setter setting a weighting factor, a deviation mixer calculating a controlled deviation by mixing the deviations, and an instruction value generator generating an assist instruction value that drives a motor to output (i) an automatic steering torque and (ii) an assist torque. The assist instruction value is generated based on the calculated controlled deviation, and by decreasing the controlled deviation in a feedback manner, so that the drive of the motor leads to a decrease of the calculated controlled deviation, thereby switching the assist and follow control without a wrong steering feeling, and without deterioration of each of assist/follow functions.

3 Claims, 6 Drawing Sheets

(56) References Cited

U.S. PATENT DOCUMENTS

| | | | | |
|---|---|---|---|---|
| 2009/0271069 A1* | 10/2009 | Yamamoto | ............. | B62D 6/008 |
| | | | | 701/41 |
| 2015/0367847 A1* | 12/2015 | Haeussler | ............. | B60W 50/10 |
| | | | | 701/41 |
| 2016/0001811 A1* | 1/2016 | Endo | .................... | B62D 5/0466 |
| | | | | 701/41 |
| 2016/0001814 A1* | 1/2016 | Endo | .................... | B62D 5/0466 |
| | | | | 701/41 |

FOREIGN PATENT DOCUMENTS

| | | |
|---|---|---|
| JP | 2015-33942 A | 2/2015 |
| JP | 2015-93569 A | 5/2015 |

OTHER PUBLICATIONS

Tagesson et al., Driver Response at Tyre Blow Out in Heavy Vehicles & the Importance of Scrub Radius, IEEE, 2014, p. 1157-1162.*
U.S. Appl. No. 15/009,451, filed Jan. 28, 2016, Akatsuka et al., JP 2013-150502.
U.S. Appl. No. 15/043,132, filed Feb. 12, 2016, Akatsuka et al., JP 2013-166294.

* cited by examiner

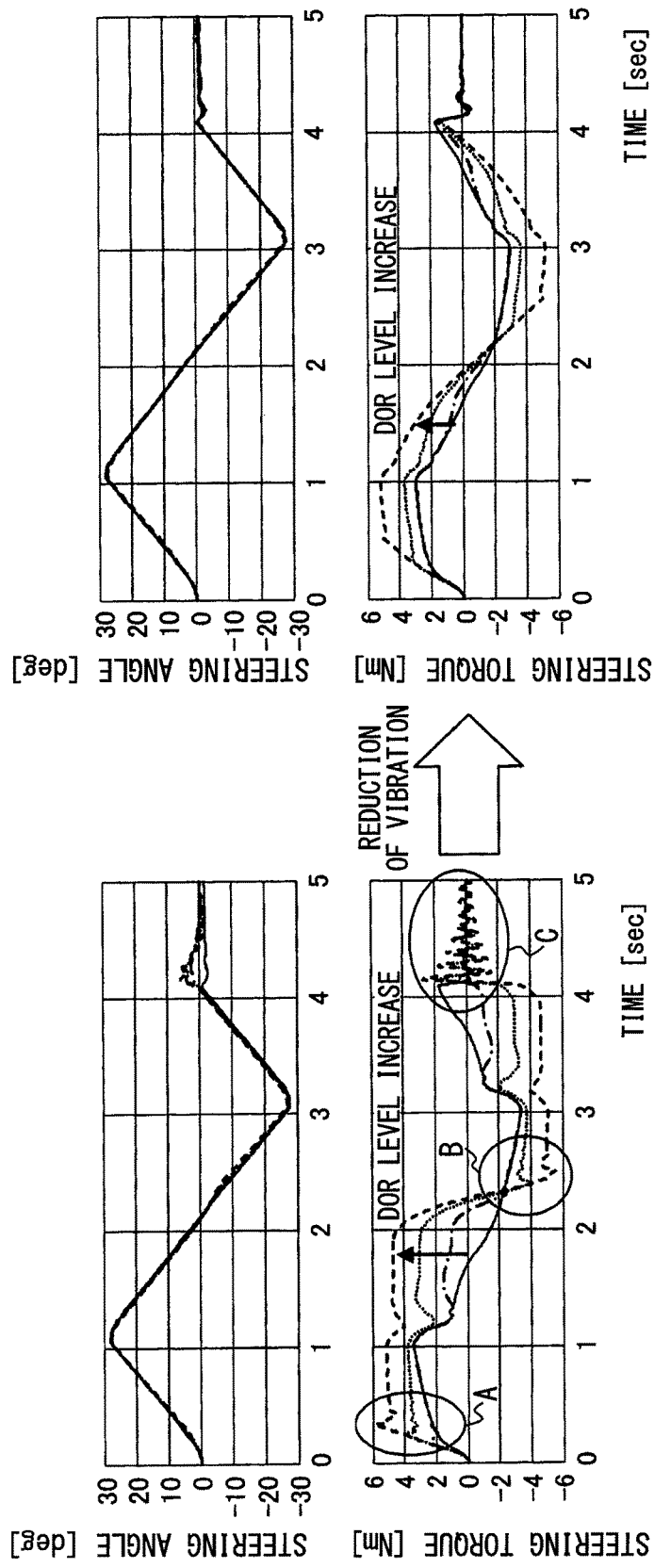

STEERING CONTROL APPARATUS

CROSS REFERENCE TO RELATED APPLICATION

The present application is based on Japanese Patent Application No. 2013-233949, filed on Nov. 12, 2013, the disclosure of which is incorporated herein by reference.

TECHNICAL FIELD

The present disclosure generally relates to a technique for controlling an assist torque and a steering angle.

BACKGROUND INFORMATION

In recent years, vehicle trajectory control is commonly performed for an automation of a steering angle control, which may be based on, for example, a motor rotation angle, a steering rotation angle, a yaw rate sensor, a deviation between a tire steer angle and its target value, a lateral shift of position from a target position derived from a camera, a laser radar, a millimeter wave radar, etc., a deviation from a target trajectory based on GPS information and the like, and a deviation relative to a curvature obtained from a road geometry.

Further, a lane keeping control in which a relationship between a currently-traveling lane and a subject vehicle is detected based on image information from the camera that captures a front field image of the subject vehicle and a suitable steering angle is provided for an along-the-lane travel of the vehicle is also common, and a power steering control (i.e., an assist control) for assisting a steering operation by a driver, both of which may already be realized by an apparatus that uses only one actuator (e.g., a motor), as disclosed in a patent document 1, JP H9-221053 A.

Fundamentally, in such apparatus, the motor is driven based on a sum between a required torque for the assist control and a required torque for the vehicle trajectory control. However, during the vehicle trajectory control, the required torque for the assist control is multiplied by a suppression factor having a value between 0 and 1, which somewhat reduces the influence of the assist control, to keep the trajectory from departing the currently-traveling lane.

In the above-described situation, when an intervention operation by the driver (i.e., Driver Override (DOR) is performed during the vehicle trajectory control, the deviation of the actual position and the actual angle from the target position and the target angle increases. Then, in the vehicle trajectory control, a cancelling torque for cancelling an increased deviation between the target position/angle and the actual position/angle is generated, which may interfere with the driver's operation. This leaves a wrong steering feel for the driver. To reduce such a wrong steering feel, the responsiveness of the vehicle trajectory control must be lowered. However, when the responsiveness of the vehicle trajectory control is simply lowered, the original functionality of the vehicle trajectory control may also deteriorate.

Further, under a certain circumstance, the vehicle trajectory control must be prioritized over the intervention operation by the driver, depending on a degree of urgency and/or a degree of necessity of the circumstance, (e.g., to avoid collision or the like). In other words, the vehicle trajectory control may override the assist control depending on a situation. However, a balance between the two demands (i.e., between (i) an urgency avoidance, that is, a control by a system intervention/override and (ii) a switching of controls without providing a wrong steering feeling) has been very difficult to achieve so far (i.e., as trade-off matters).

SUMMARY

It is an object of the present disclosure to provide a steering control apparatus, which is designed to perform both of the assist control and the vehicle trajectory control, to switch the controls with no wrong steering feeling and no compromise for the functionality of each of the two controls (i.e., the assist control and the vehicle trajectory control).

In an aspect of the present disclosure, the steering control apparatus includes an assist deviation calculator calculating an assist deviation between (i) a detected steering torque that is a detection value of a steering torque, and (ii) a target steering torque that is targeted in an assist control that is performed for decreasing a steering load, a follow deviation calculator calculating a follow deviation between (i) a detected physical quantity of steering operation that has a measurement unit other than a torque, and (ii) a target physical quantity in a control of a vehicle trajectory control, a unit converter converting a measurement unit for at least one of the assist deviation and the follow deviation, for a matching of the measurement unit of the respective deviations, a weighting factor setter setting a weighting factor for each of the assist deviation and the follow deviation, based on a degree of driver intervention in the vehicle trajectory control, and a degree of necessity of the vehicle trajectory control, a deviation mixer calculating a controlled deviation by mixing the assist deviation and the follow deviation, according to the setting by the weighting factor setter, and an instruction value generator generating an assist instruction value that drives a motor to output (i) an automatic steering torque for the vehicle trajectory control and (ii) an assist torque for the assist control. The assist instruction value is generated based on the controlled deviation calculated by the deviation mixer, to decrease the controlled deviation.

According to the present disclosure, by mixing the assist deviation and the follow deviation after the matching of the measurement unit of both deviations, a controlled deviation that is used for generating the assist instruction value is generated, and the weighting factors used for the generation of the controlled deviation are changed according to the degree of driver intervention in the vehicle trajectory control. Further, the greater the ratio of the follow deviation is, the higher the responsiveness of the vehicle trajectory control becomes, and the greater the ratio of the assist control is, the lower the responsiveness of the vehicle trajectory control becomes. In such manner, the switching between the assist control and the vehicle trajectory control is seamlessly performable without leaving a wrong steering feeling for the driver.

Further, according to the present disclosure, the weighting factor is changed according also to a degree of necessity of the vehicle trajectory control. Therefore, the responsiveness of the vehicle trajectory control is changeable according to a situational factor for the changes of the degree of necessity of the vehicle trajectory control.

For example, in a situation in which the degree of necessity of the vehicle trajectory control is high, the driver intervention in the system is suppressed for fully-exerted functioning of a vehicle trajectory control by raising the responsiveness of the vehicle trajectory control.

For the balancing of the assist control and the vehicle trajectory control, other than the method of the present disclosure, the individual instruction values may be respectively generated for the assist control and the vehicle trajectory control, and for generating a final instruction value as a mixture (i.e., an addition) of the two individual instruction values. However, in such case, when the ratio of the vehicle trajectory control instruction value is increased in the final instruction value (i.e., when the responsiveness of the vehicle trajectory control is raised), a torque overshoot and/or a vibration may be caused during a transition period (e.g., for a steering starting time, for a steer-back-and-forth time, and for a steering ending time: see FIG. 7A). Such a torque overshoot and/or a vibration is suppressed by the control scheme of the present disclosure, thereby enabling the driver to perform the steering operation without a wrong feeling (see FIG. 7B).

The present disclosure may be applicable and realizable in various forms besides the steering control apparatus, such as a system including a steering control apparatus, a program for controlling a computer to be serving as required elements of the steering control apparatus, a steering control method and the like.

BRIEF DESCRIPTION OF THE DRAWINGS

Objects, features, and advantages of the present disclosure may become more apparent from the following detailed description made with reference to the accompanying drawings, in which:

FIG. 7A is a graph of a measurement of a steering torque for each of several DOR levels showing a comparative example of synthesizing of after-servo-control outputs.

FIG. 7B is a graph of a measurement of a steering torque for each of several DOR levels showing an embodiment of the present disclosure about a mixture of pre-servo-control deviations.

DETAILED DESCRIPTION

An embodiment of the present disclosure is described below with reference to the drawings.

<Entire Configuration>

Figure 1:
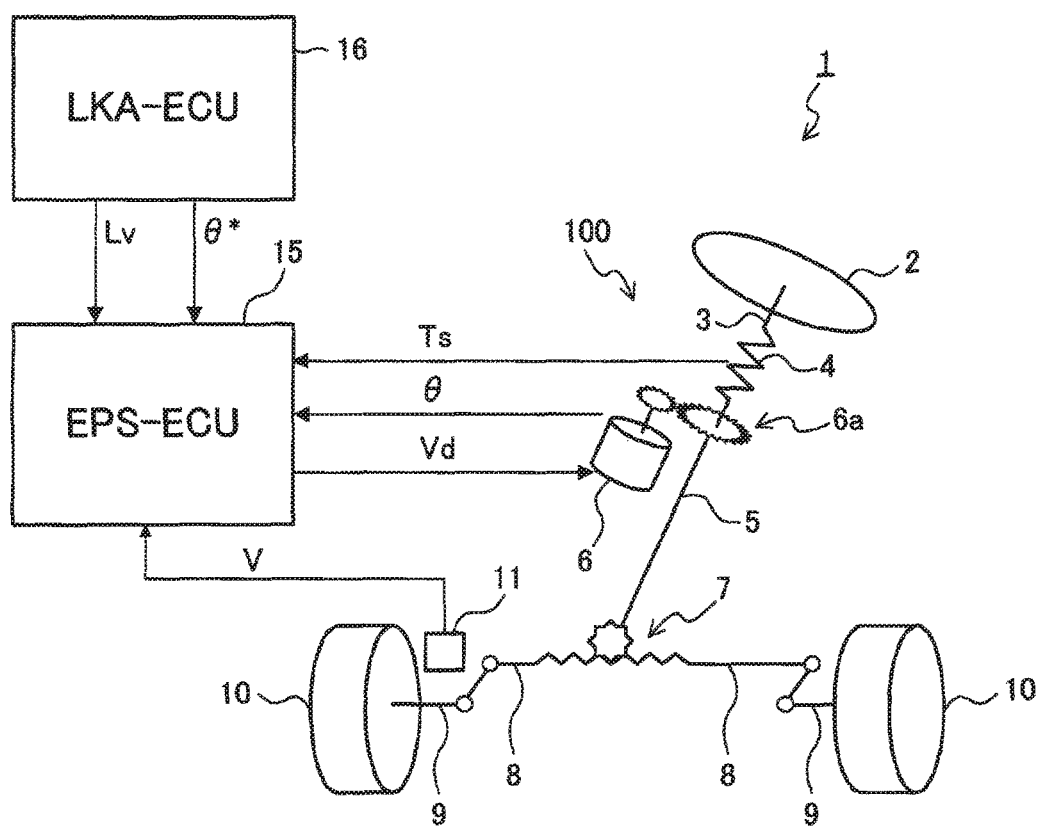
FIG. 1 is a block diagram of configuration of an electric steering system in an embodiment of the present disclosure.

An electric steering system 1 of the present embodiment is configured to perform, as shown in FIG. 1, a lane keeping control, which is one of the vehicle trajectory controls, by an automatic steering using a motor 6 along a preset course of travel in a travel lane on the road, as well as performing an assist control for assisting a driver's operation of a steering member (i.e., a steering wheel 2).

The steering wheel 2 is fixedly attached to one end of a steering shaft 3, and a torque sensor 4 is connected to the other end of the steering shaft 3, and an intermediate shaft 5 is connected to the other end of the torque sensor 4. In the following description, an entirety of shaft structure from the steering shaft 3 to the intermediate shaft 5 through the torque sensor 4 may also be collectively called as a steering shaft.

The torque sensor 4 is a sensor for detecting a steering torque Ts. More practically, the torque sensor 4 has a torsion bar that connects the steering shaft 3 and the intermediate shaft 5, and a torque currently applied to the torsion bar is detected based on a torsion angle of the torsion bar.

The motor 6 is used for generating an assist torque based on the assist control, and for generating the automatic steering torque based on the vehicle trajectory control, and a rotation of the motor 6 is transmitted to the intermediate shaft 5 via a deceleration mechanism 6a. Namely, a worm gear provided at a tip of the revolving shaft of the motor 6 engages a worm wheel that is coaxially provided on the intermediate shaft 5 for providing the deceleration mechanism 6a, enabling a transmission of rotation of the revolving shaft of the motor 6 to the intermediate shaft 5. Conversely, when the intermediate shaft 5 rotates according to a reaction force of the road surface (i.e., a road surface reaction force) or according to an operation of the steering wheel 2, the rotation is transmitted to the motor 6 via the deceleration mechanism 6a, for rotating the motor 6.

The motor 6 may be a brushless motor, for example, and has a rotation sensor inside (e.g., a resolver). The rotation sensor at least outputs a steering wheel angle (i.e., a steering angle) θ that is calculated by multiplying a motor rotation angle by a gear ratio of the deceleration mechanism 6a. Further, instead of outputting the steering wheel angle θ, the motor rotation angle may be outputted as is.

The other end of the intermediate shaft 5 (i.e., an opposite end of the shaft 5) relative to one end that is connected to the torque sensor 4, is connected to a steering gear box 7.

The steering gear box 7 is provided as a gear system that consists of a rack gear and a pinion gear, and a gear tooth of the rack gear engages with the pinion gear that is provided on the other end of the intermediate shaft 5.

Therefore, when the driver rotates the steering wheel 2, the intermediate shaft 5 also rotates (i.e., the pinion gear rotates), and by the intermediate shaft 5, the rack gear moves to the right or to the left.

A tie rod 8 is attached to each of both ends of the rack gear, respectively, and the tie rod 8 moves reciprocally to the left or to the right together with the rack gear. In such manner, the direction of each tire 10 is steered by a push and a pull from the tie rod 8 via a knuckle arm 9.

A speed sensor 11 for detecting a vehicle speed V is provided at a predetermined part in the vehicle.

In the following, a whole mechanism for transferring a steering force from the steering wheel 2 to the tire 10 may collectively be designated as a steering system mechanism 100.

The steering system mechanism 100, which has an above-described configuration, when the steering wheel 2 rotates according to the steering operation of the driver, the rotation is transmitted to the steering gear box 7 via the steering shaft 3, the torque sensor 4, and the intermediate shaft 5. Then, the rotation of the intermediate shaft 5 is turned into a right and left movement of the tie rod 8 and, as the tie rod 8 moves in the steering gear box 7, both tires 10 on both sides are steered.

Lane Keeping Assistance-Electronic Control Unit (LKA-ECU) 16 operates on a supply of electric power from an in-vehicle battery (not illustrated), and detects a position of the subject vehicle in a travel lane, or the travel lane itself based on a front field image of the subject vehicle from an in-vehicle camera, which is also not illustrated, and sets up a target trajectory based on the detection result.

Further, based on the detected vehicle speed, the detected value of the steering angle, etc., a target steering angle θ*, which is a target value of the steering angle for traveling along the target trajectory, is set up.

Since the process that sets up such target steering angle θ* is a well-known technique in lane keeping control, the details of such control is omitted from the following description.

Further, LKA-ECU 16 detects various target objects in the front field image of the subject vehicle, in terms of an object in a vehicle travel environment (i.e., obstacles and vehicles traveling in a self-lane and/or adjacent lanes), and calculates a reliability of a recognition state of the target objects, and estimates a degree of danger of each of the target objects based on a relationship between each of the target objects and the subject vehicle (i.e., based on a relative speed, a distance, whether in the same lane etc.). The calculation and estimation of the reliability and the degree of danger are performed by any one of known method in the art of vehicle control. Further, according to the reliability and the degree of danger, a DOR level Lv is output to Electric Power Steering-Electronic Control Unit (EPS-ECU) 15 together with the above-mentioned target steering angle θ*. The Driver Override (DOR) level Lv is an index about a "driver override" that takes a greater value with no discrete steps between 1 and 4 in the present embodiment as the reliability or the degree of danger increases to a high value.

EPS-ECU 15 operates on a supply of electric power from the non-illustrated in-vehicle battery, and calculates an assist instruction Ta* (i.e., an electric current instruction value) for a generation of an assist torque and an automatic steering torque, based on the target steering angle θ* from LKA-ECU 16, the DOR level Lv, the steering torque Ts detected by the torque sensor 4, the steering angle θ from the motor 6, and the vehicle speed V detected by the speed sensor 11. Then, by applying a drive voltage Vd according to the assist instruction Ta* to the motor 6, EPS-ECU 15 generates the assist torque and the automatic steering torque.

That is, EPS-ECU 15 realizes a desired steering characteristic by the control of the drive voltage Vd for driving the motor 6, thereby controlling the steering system mechanism 100 that is driven by the motor 6.

<EPS-ECU>

Figure 2:
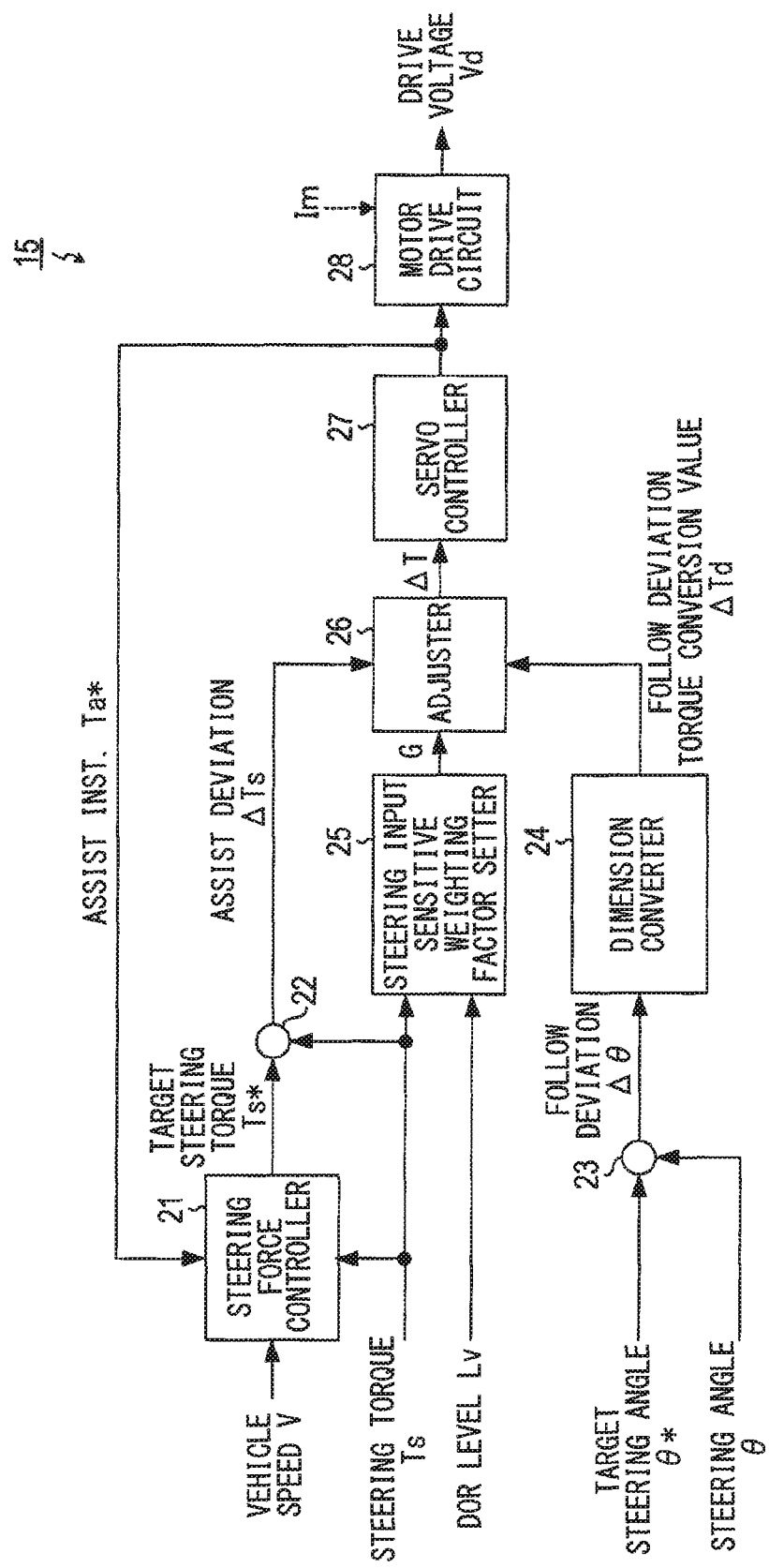
FIG. 2 is a block diagram of EPS-ECU.

EPS-ECU 15 is provided with a steering force controller 21, an assist deviation calculator 22, a follow deviation calculator 23, a dimension converter 24, a steering input sensitive weighting factor setter 25, an adjuster 26, a servo controller 27, and a motor drive circuit 28 as shown in FIG. 2. Among them, components other than the motor drive circuit 28 are implemented by an execution of preset control programs by a non-illustrated Central Processing Unit (CPU) in EPS-ECU 15.

However, software implementation of those components is only an example, and at least a part of those components may also be realizable as hardware components.

The steering force controller 21 (i.e., an assist deviation calculator) generates a target steering torque Ts* based on the assist instruction Ta*, the steering torque Ts, and a travel speed (i.e., vehicle speed) V of the subject vehicle.

Figure 3:
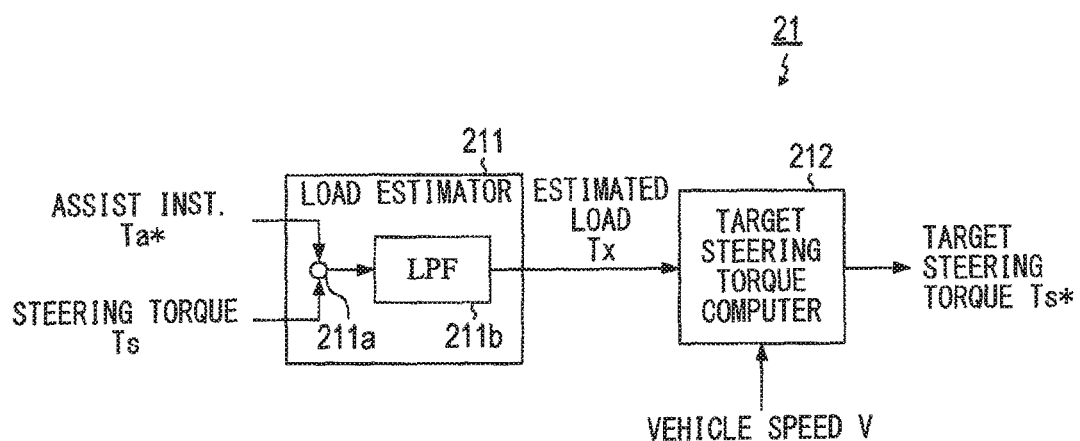
FIG. 3 is a block diagram of a steering force controller.

As shown in FIG. 3, more specifically, the steering force controller 21 has a load estimator 211 and a target steering torque computer 212.

The load estimator 211 has an adder 211*a* that adds the assist instruction Ta* and the steering torque Ts, and a Low Pass Filter (LPF) 211*b* that extracts, from a result of addition of the adder 211*a*, a frequency component in frequency band of a preset frequency or lower, and outputs the extracted frequency component extracted by the LPF 211*b*, which serves as an estimated load Tx (i.e., an estimation of a road surface load). For the extraction of the desired frequency component, LPF 211*b* is configured to pass (i.e., extract) a frequency component of 10 Hz or less in general by filtering the frequency component higher than 10 Hz, since the drier mainly relies on information on a steering reaction force of 10 Hz or less.

Figure 4:
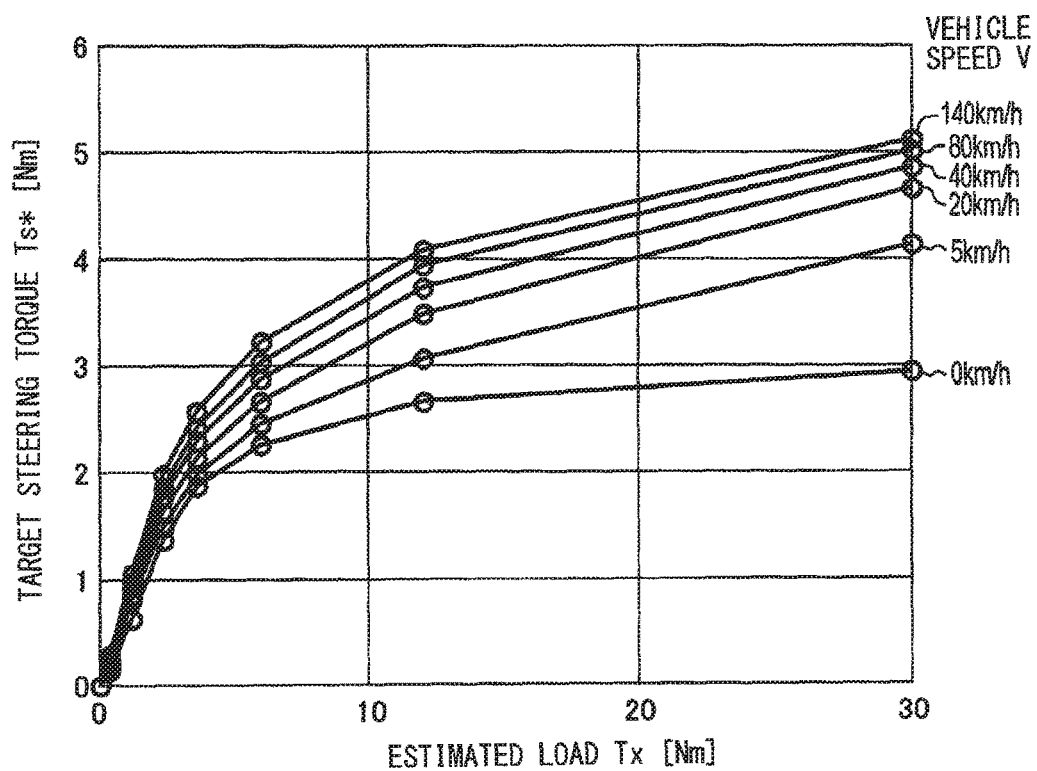
FIG. 4 is a graph a conversion characteristic from an estimated load to a target steering torque.

The target steering torque computer 212 computes the target steering torque Ts*, which is a target value of the steering torque, using a target steering torque calculation map shown in FIG. 4, and based on the estimated load Tx that is estimated by the load estimator 211 and the vehicle speed V.

The map in FIG. 4 shows the characteristics of a function only for a positive value of the estimated load Tx takes a positive value. For a negative value of the estimated load Tx, the characteristics of such a function are assumed to have a point-symmetric shape relative to an origin of the graph in FIG. 4.

Returning the description back to FIG. 2, the assist deviation calculator 22 calculates an assist deviation ΔTs, which is a difference between the steering torque Ts and the target steering torque Ts*.

The follow deviation calculator 23 calculates a follow deviation Δθ, which is a difference between the steering angle θ and the target steering angle θ*.

The dimension converter 24 (e.g., a unit converter) calculates a follow deviation torque conversion value ΔTd that is derived by performing a torque conversion of the follow deviation Δθ. In such torque conversion calculation, a dimension (i.e., a measurement unit) of the follow deviation Δθ is converted to a dimension (i.e., a measurement unit) of the assist deviation ΔTs, based on a relationship between a force that is applied to one end of the torsion bar and a twist angle (i.e., based on a torsion rigidity). The conversion equation for such calculation may be arbitrarily determined based on a structure around the torsion bar, thereby details of such equation are omitted from the description. Further, the dimension converter 24 also performs a phase correction, for correcting a phase difference between a phase of the angle and a phase of the torque.

The adjuster 26 (e.g., a deviation mixer) calculates a controlled deviation ΔT by using an equation (1) according to the steering input sensitive weighting factor G that is set up by the steering input sensitive weighting factor setter 25, from the assist deviation ΔTs and the follow deviation torque conversion value ΔTd. A value of G falls in a range between 0 and 1.

$$\Delta T = (1-G) \times \Delta Ts + G \times \Delta Td \quad \text{Equation (1)}$$

That is, when G=0, only the assist control is performed, and, when G=1, only the vehicle trajectory control is performed. Further, when G decreases, more priority is given to the assist control, and when G increases, more priority is given to the vehicle trajectory control.

The servo controller 27 (e.g., an instruction value generator) generates, based on the controlled deviation ΔT, the assist instruction Ta* (i.e., the assist instruction value) for generating an assist torque (i.e., also designated as an assist amount) that ultimately converges (i.e., decreases) the controlled deviation ΔT to zero.

Figure 5:
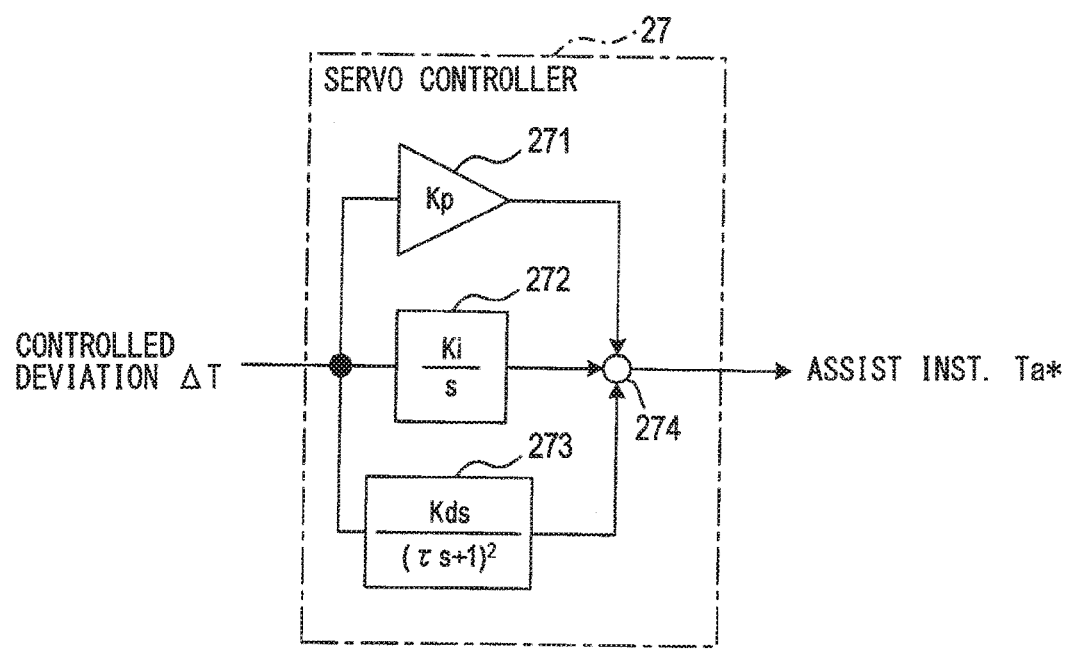
FIG. 5 is a block diagram of a servo controller.

More practically, the servo controller 27 includes, as shown in FIG. 5, a proportional controller 271 that generates a proportional component that is proportional to the controlled deviation ΔT, an integration controller 272 that generates an integral component that is proportional to a time integration of the controlled deviation ΔT, a differential controller 273 that generates a differential component that is proportional to a differentiation of the controlled deviation ΔT, and an instruction-value computer 274 that generates the assist instruction Ta* by adding the proportional component, the integral component, and the differential component, for performing a so-called Proportional-Integral-Derivative (PID) control.

In FIG. 5, Kp is a gain for the proportional component (i.e., a proportional gain), Ki is a gain for the integral component (i.e., an integration gain), Kd is a gain of the differential component (i.e., a differential gain), 's' is a Laplacian operator, and a term $s/(\tau s+1)^2$ is a pseudo differential calculation.

Returning the description to FIG. 2, the motor drive circuit 28 applies the drive voltage Vd to the motor 6 based on the assist instruction Ta*, so that the torques corresponding to the assist instruction Ta* (i.e., the assist torque and the automatic steering torque) are applied to the steering shaft.

More practically, a feedback control of the drive voltage Vd that targets the assist instruction Ta* as a target electric current is performed, for controlling an electric current Im supplied to the motor 6 to match the target electric current. In such manner, a desired torque is provided for the steering shaft.

Figure 6:
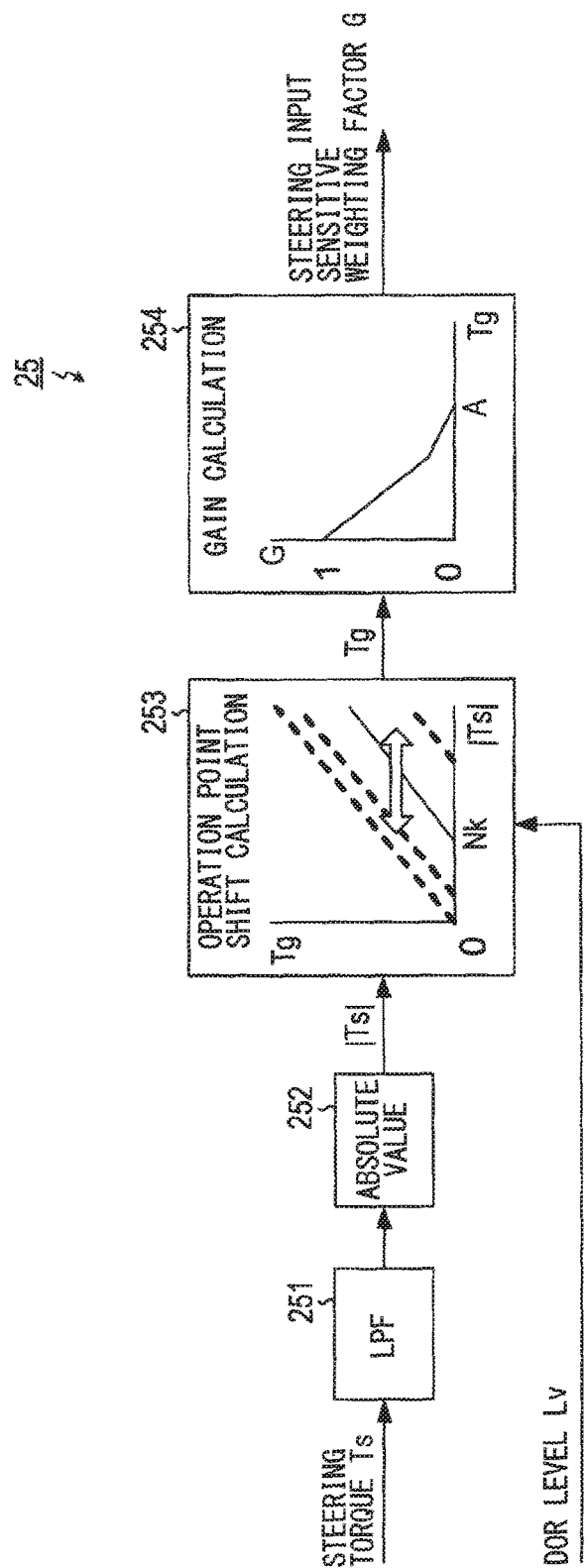
FIG. 6 is a block diagram of a steering input sensitive weighting factor setter.

Based on the steering torque Ts and the DOR level Lv, the steering input sensitive weighting factor setter 25 sets up the steering input sensitive weighting factor G, and, as shown in FIG. 6, the weighting factor setter 25 is provided with LPF 251, an absolute value computer 252, an operation point shifter 253, and a weighting factor computer 254.

LPF 251 is a low pass filter that removes noise components from the steering torque Ts other than intervention operations by the driver (e.g., removing road surface disturbance that is superposed on the steering torque Ts). The absolute value computer 252 calculates an absolute value of the steering torque (i.e., |Ts|, from an output of LPF 251 from which the noise components are already removed).

The operation point shifter 253 calculates a weighting factor calculation torque Tg as its output, based on an input of the absolute value of the steering torque |Ts| and by using a shift calculation map prepared in advance or a function equation.

The shift calculation map may have, for example, a characteristic in which the greater the input |Ts| is, the greater the output Tg becomes.

However, such a characteristic is shifted according to the DOR level Lv (i.e., the greater the DOR level is, the wider a dead zone of the input |Ts| becomes). In other words, when the DOR level Lv is 1 (i.e., the minimum), there is no dead zone, and the output Tg is always proportional to the input |Ts|, (i.e., Tg=α×|Ts| (i.e., α=1 in this case). When the DOR level Lv is k (k>1), assuming that a boundary value of the dead zone is Nk, Tg=0 when 0≤|Ts|≤Nk, and Tg=α×(|Ts|−Nk) when |Ts|>Nk.

The weighting factor computer 254 calculates the steering input sensitive weighting factor G as its output, by using the weighting factor calculation map prepared in advance, and based on the input of the weighting factor calculation torque Tg, and outputs the calculation result (i.e., the weighting factor G to the adjuster 26).

The weighting factor calculation map is set to G=1 when Tg=0, and is set to G=0 when Tg≥A, and, for a range 0<Tg<A, G takes a smaller value as Tg increases within a range of 0<G<1. Note that a shape of the graph regarding the map characteristic may be arbitrarily set for a range of 0<Tg<A, as long as G decreases as Tg increases (i.e., the decrease of G may be linear or may be curved (e.g., quadratic)).

In other words, the steering input sensitive weighting factor G set up by the steering input sensitive weighting factor setter 25 takes a maximum value of G=1 when the absolute value of the steering torque |Ts| is zero. In such case, the controlled deviation ΔT generated by the adjuster 26 equates to the follow deviation torque conversion value ΔTd, causing only the vehicle trajectory control to be performed.

Further, the steering input sensitive weighting factor G decreases toward zero as the absolute value of the steering torque |Ts| increases, thereby causing a decrease of a ratio of the follow deviation torque conversion value ΔTd in the controlled deviation ΔT, and causing an increase of a ratio of the assist deviation ΔTs. That is, in proportion to an increase of the absolute value of the steering torque |Ts|, the influence of the assist control increases, and when the steering input sensitive weighting factor G takes the minimum value G=0, the controlled deviation ΔT becomes equal to the assist deviation ΔTs, thereby only the assist control is performed.

Further, when the steering input sensitive weighting factor G starts to decrease, the greater the DOR level Lv is, and the greater the decrease-starting absolute value of the steering torque |Ts| becomes. This defines a start point of decrease of the weighting factor G, demanding a greater steering force for the driver for the operation of the steering wheel 2, and starts the decrease of the steering input sensitive weighting factor G to be smaller than 1. That is, when the DOR level Lv is high, the vehicle trajectory control is prioritized, making it difficult for the driver to intervene in such a control.

<Experiment>

When the vehicle trajectory control is being performed with the target steering angle θ*=0 [deg], the driver performs a steering operation in a range of ±30 [deg], which looks like a ramp shape, and the steering angle θ and the steering torque Ts that are detected during such a steering operation in the ramp shape are simulated. The graph in FIG. 7B shows a result of the present embodiment, and the graph in FIG. 7A shows a result of the comparative example. Both show that the DOR level Lv is changed in four steps 1 to 4.

In the comparative example, a base assist instruction that results from the servo control of the assist deviation ΔTs, and a follow instruction that results from the servo control of the follow deviation Δθ are mixed (i.e., two servo control results are mixed), by the steering input sensitive weighting factor G for the calculation of the assist instruction Ta*.

According to the graph in FIGS. 7A/B, as the DOR level Lv increases, the steering torque for the driver to perform the intervention operation becomes heavier (i.e., the force maintaining the steering angle θ to the target steering angle θ* in the vehicle trajectory control becomes stronger). Further, in the comparative example, during the steering operation transition period (e.g., for a steering starting time of A, for a steer-back-and-forth time of B, and for a steering ending time of C in FIG. 7A), a torque vibration is caused. In contrast, according to the present embodiment, the torque vibration during the steering operation transition period is prevented.

<Effect>

As described above, according to the present embodiment, the controlled deviation ΔT is generated by mixing the assist deviation ΔTs and the follow deviation torque conversion value ΔTd, while controlling the steering input sensitive weighting factor G according to the absolute value of the steering torque |Ts|, so that, the greater the |Ts| is (i.e., when the degree of the driver intervention in the vehicle trajectory control is greater), the ratio of the assist deviation ΔTs in the controlled deviation ΔT increases. In such manner, the switching between the assist control and the vehicle trajectory control is seamlessly performable (i.e., without leaving a wrong steering feeling for the driver).

Further, according to the present embodiment, the steering input sensitive weighting factor G is changed according to the DOR level Lv, which is an indicator of the degree of necessity of the vehicle trajectory control, and such a change of the steering input sensitive weighting factor G adjusts/controls the steering torque for the intervention operation by the driver to be heavier when the DOR level Lv is higher.

Therefore, in a situation in which a degree of necessity for the vehicle trajectory control is high, the intervention operation of the driver is suppressed, thereby enabling the functionality of the vehicle trajectory control to be fully exerted.

Further, in the present embodiment, the torque overshoot and/or the torque vibration during the steering operation transition period is suppressed, thereby preventing a wrong steering feeling due to such torque overshoot/vibration.

Other Embodiments

The embodiments of the present disclosure described above are only a few examples of the features, thereby not limiting the present disclosure in any manner. That is, various modifications and other changes are also considered to be within the scope of the present disclosure.

(1) The lane keeping control is described as an illustrative example of the vehicle trajectory control in the above-mentioned embodiment. However, any control about the automatic steering (i.e., an automatic control of a steering angle) is within the scope of the present disclosure, as long as such control is based on, for example, a motor rotation angle, a steering rotation angle, a yaw rate sensor, a deviation between a tire steer angle and its target value, a lateral shift of position from a target position derived from a camera, a laser radar, a millimeter wave radar, etc., a deviation from a target trajectory based on GPS information and the like, a deviation relative to a curvature obtained from a road geometry.

(2) According to the above-mentioned embodiment, the dimension converter 24 converts the follow deviation (i.e., a deviation of the target physical quantity) AO to be compatible with a dimension (i.e., a measurement unit) of the assist deviation ΔTs. However, conversely the dimension of the assist deviation ΔTs may be converted to the dimension of the follow deviation Δθ. Further, the dimension of the both deviations may be converted to a third dimension.

(3) According to the above-mentioned embodiment, the steering input sensitive weighting factor setter 25 sets a larger dead zone for the steering torque Ts as the DOR level Lv increases. However, other dead zone setting schemes may also be usable as long as an amount of the decrease of the weighting factor of the follow deviation is reduced as the DOR level Lv increases (i.e., when a degree of necessity of the vehicle trajectory control is higher).

(4) Each component of the present disclosure is basically a conceptual one, and is not limited to a form in the above-mentioned embodiments.

For example, a function in one component may be distributed to two or more components, or a function realized by two or more components may be aggregated to only one component. Further, a part of the configuration of the above-described embodiment may be replaced with other configuration in well-known type. Further, a part of the configuration of above-described embodiment may be added to the embodiments of the present disclosure other than the subject embodiment, or may be replaced with the configuration of the other-than subject embodiment of the present disclosure.

Although the present disclosure has been described in connection with preferred embodiment thereof with reference to the accompanying drawings, it is to be noted that various changes and modifications may become apparent to those skilled in the art, and such changes, modifications, and summarized schemes are to be understood as being within the scope of the present disclosure as defined by appended claims.

What is claimed is:

1. A steering control apparatus comprising:
    an assist deviation calculator calculating an assist deviation between (i) a detected steering torque that is a detection value of a steering torque, and (ii) a target steering torque that is targeted in an assist control that is performed for decreasing a steering load;
    a follow deviation calculator calculating a follow deviation between (i) a detected physical quantity of steering operation that has a measurement unit other than a torque, and (ii) a target physical quantity in a control of a vehicle trajectory control;
    a unit converter converting a measurement unit for at least one of the assist deviation and the follow deviation, for a matching of the measurement unit of the respective deviations;
    a weighting factor setter setting a weighting factor for each of the assist deviation and the follow deviation, based on a degree of driver intervention in the vehicle trajectory control, and a degree of necessity of the vehicle trajectory control;
    a deviation mixer calculating a controlled deviation by mixing the assist deviation and the follow deviation, according to the setting by the weighting factor setter; and
    an instruction value generator generating an assist instruction value that drives a motor to output (i) an automatic steering torque for the vehicle trajectory control and (ii) an assist torque for the assist control, the assist instruction value is generated based on the controlled deviation calculated by the deviation mixer, to decrease the controlled deviation.

2. The steering control apparatus of claim 1, wherein the weighting factor setter sets the weighting factor in a manner, in which
    a) the weighting factor of the follow deviation is decreased as an input representing a degree of the driver intervention in the vehicle trajectory control increases, and
    b) an amount of decrease of the weighting factor of the follow deviation is reduced as the degree of necessity of the vehicle trajectory control increases.

3. The steering control apparatus of claim 1, wherein the degree of necessity of the vehicle trajectory control is set based on at least one of (i) a reliability of a recognition state of a target object in a vehicle environment and (ii) a degree of danger that is estimated, based on a relationship between the target object and a subject vehicle in which the steering control apparatus is installed, an increase of the degree of necessity of the vehicle trajectory control being proportional to both of a level of the reliability, and a level of the degree of danger.

* * * * *